(12) United States Patent
Maeda et al.

(10) Patent No.: US 6,428,930 B2
(45) Date of Patent: *Aug. 6, 2002

(54) LITHIUM SECONDARY BATTERY

(75) Inventors: Takeshi Maeda, Katano; Hideyuki Inomata, Hyogo; Naoya Nakanishi, Tondabayashi; Ikuo Yonezu; Koji Nishio, both of Hirakata, all of (JP)

(73) Assignee: Sanyo Electric Co., Ltd., Moriguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,353

(22) Filed: Dec. 24, 1998

(30) Foreign Application Priority Data

Dec. 26, 1997 (JP) .............................. 9-368674

(51) Int. Cl.$^7$ .................... H01M 4/48; H01M 4/50; H01M 4/52
(52) U.S. Cl. ................ 429/224; 429/231.1; 429/231.3; 429/232
(58) Field of Search ........................... 429/218.1, 231.1, 429/231.3, 232, 224

(56) References Cited

U.S. PATENT DOCUMENTS

| | | | | |
|---|---|---|---|---|
| 4,567,031 A | * | 1/1986 | Riley ......................... | 423/593 |
| 5,429,890 A | * | 7/1995 | Pynenburg et al. ......... | 429/192 |
| 5,443,929 A | | 8/1995 | Yamamoto et al. | |
| 5,478,675 A | * | 12/1995 | Nagaura ..................... | 429/224 |
| 5,561,007 A | * | 10/1996 | Saidi ......................... | 429/224 |
| 5,783,333 A | * | 7/1998 | Mayer ........................ | 429/223 |
| 5,789,110 A | * | 8/1998 | Saidi et al. ................. | 429/218 |

FOREIGN PATENT DOCUMENTS

| | | |
|---|---|---|
| JP | 05013107 A | 1/1993 |
| JP | 05198301 A | 8/1993 |
| JP | 06243869 A | 9/1994 |

* cited by examiner

*Primary Examiner*—Carol Chaney
(74) *Attorney, Agent, or Firm*—Armstrong, Westerman & Hattori, LLP

(57) ABSTRACT

A lithium secondary battery according to the present invention comprises:

- a positive electrode having a positive electrode active material composed of a reversible lithium intercalation material;
- a negative electrode having a negative electrode active material composed of a reversible lithium intercalation material; and
- a separator interposed between said positive electrode and said negative electrode,
- and in the positive electrode active material, at least one material which shows a positive sign of a total sum of entropy heat from a discharged state to a charged state is mixed with at least one material which shows a negative sign of a total sum of an entropy heat from a discharged state to a charged state. In a battery having such a construction, the amount of entropy heat during charge is reduced compared with a battery employing only a material which shows a positive sign of the total sum of entropy heat. As a result of this, a battery produced in accordance with the present invention achieves an improved cycle characteristic, and thereby is capable of preventing a large deterioration of a battery performance.

3 Claims, 2 Drawing Sheets

LITHIUM SECONDARY BATTERY

BACKGROUND OF THE INVENTION

(1) Field of the Invention

This invention relates to a lithium secondary battery, and more particularly to a lithium secondary battery comprising a positive electrode comprising a positive electrode active material composed of a reversible lithium intercalation material, a negative electrode comprising an active material composed of a reversible lithium intercalation material, and a separator interposed therebetween.

(2) Description of the Prior Art

In recent years, lithium secondary batteries have drawn considerable attention as a secondary battery capable of achieving high energy density and high power density. For the lithium secondary batteries, $LiNiO_2$, $LiCoO_2$, and the like have generally been used as a positive electrode active material thereof.

The lithium secondary batteries have been produced over a wide range of sizes, and among them, large-sized lithium secondary batteries are susceptible to such drawbacks that a battery temperature is raised during charge and discharge and a cycle characteristic is thereby deteriorated. This is due to the following reasons. While small-sized lithium secondary batteries retain a certain battery surface area per unit volume of power generating element, and a heat releasing quality thereof is not very much decreased. On the other hand, in the large-sized lithium secondary batteries, the battery surface area per unit volume of power generating element is rendered extremely small, and therefore the heat releasing quality is considerably deteriorated.

In relation to the above, a study by the present inventors has confirmed that there are two causes for the heat generated during charge and discharge, one being a heat generated by an internal resistance of the battery, and the other being a heat generated by an entropy change.

SUMMARY OF THE INVENTION

In view of the above, it is an object of the present invention to provide a lithium secondary battery capable of suppressing an increase of battery temperatures during charge and discharge by curbing the heat generated by an entropy change, and thereby achieving a remarkably improved cycle characteristic.

This and other objects are accomplished, in accordance with a first aspect the present invention, by providing a lithium secondary battery comprising:

a positive electrode having a positive electrode active material composed of a reversible lithium intercalation material;

a negative electrode having a negative electrode active material composed of a reversible lithium intercalation material; and a separator interposed between the positive electrode and the negative electrode, the positive electrode active material being a mixture in which at least one material which shows one of positive and negative signs of a total sum of entropy heat from a discharged state to a charged state is mixed with at least one material which shows the other one of the signs of the total sum of entropy heat from a discharged state to a charged state.

The following are the reasons for accomplishing the above-mentioned object.

In a battery produced in accordance with the above construction, while the battery being charged, an exothermic reaction occurs in the case where a material which shows a positive sign of the total sum of entropy heat is employed, whereas an endothermic reaction occurs in the case where a material which shows a negative sign of the total sum of entropy heat is employed. Therefore, during charge of such a battery, the amount of entropy heat is reduced in comparison with a battery employing only the material which shows a positive sign of the total sum of entropy. On the other hand, while the battery being discharged, an exothermic reaction occurs in the case where a material which shows a negative sign of the total sum of entropy heat is employed, whereas an endothermic reaction occurs in the case where a material which shows a positive sign of the total sum of entropy heat is employed. Therefore, during discharge of such a battery, the amount of entropy heat is reduced in comparison with a battery employing only the material which shows a negative sign of entropy heat.

This indicates that, in a battery employing either exclusively a material which shows a positive sign of entropy heat or exclusively a material which shows a negative sign of entropy heat, the battery temperature is increased either during charge or during discharge, and thereby the cell is conspicuously degraded and the cycle characteristic is deteriorated, On the contrary, the battery made in accordance with the above construction can suppress the increase of the battery temperature both during charge and discharge. Therefore such an undesirable effect as the degradation of the battery is avoided, and the cycle characteristic can be increased.

In accordance with a second aspect of the present invention, there is provided a lithium secondary battery comprising:

a positive electrode having a positive electrode active material composed of a reversible lithium intercalation material;

a negative electrode having a negative electrode active material composed of a reversible lithium intercalation material; and a separator interposed between the positive electrode and the negative electrode, the positive electrode active material being a mixture in which at least one material which shows one of positive and negative signs of entropy heat during charge at a potential of 3.0 V is mixed with at least one material which shows the other one of the signs of entropy heat during charge at the potential of 3.0 V, the potential being determined with reference to a potential of lithium metal at a temperature of 25° C.

As in this aspect of the invention, when the materials each showing a different sign of entropy heat during charge at a discharge potential (3.0 V) are mixed, the amount of entropy heat is reduced for the same reasons as described above, and therefore the cycle characteristic is improved.

Furthermore, as a third aspect of the invention, in a lithium secondary battery according to the present invention, the positive electrode active material may be a mixture in which at least one material which shows one of positive and negative signs of entropy heat during charge in a potential of more than 3.0 V and less than 4.2 V is mixed with at least one material which shows the other one of the signs of entropy heat during charge in the potential of more than 3.0 V and less than 4.2 V, the potential being determined with reference to a potential of lithium metal at a temperature of 25° C.

As in this construction of the invention, when the materials each showing a different sign of entropy heat during charge at an intermediate potential between a discharge potential and a charge potential (more than 3.0 V and less than 4.2 V) are mixed, the amount of entropy heat is reduced for the same reasons as described above, and therefore the cycle characteristic is improved.

Furthermore, in a lithium secondary battery according to the present invention, the positive electrode active material may be a mixture in which at least one material which shows one of positive and negative signs of entropy heat during charge at a potential of 4.2 V is mixed with at least one material which shows the other one of the signs of entropy heat during charge in the potential of 4.2 V, the potential being determined with reference to a potential of lithium metal at a temperature of 25° C.

As in the above construction of the invention, when the materials each showing a different sign of entropy heat during charge at a charge potential (4.2 V) are mixed, the amount of entropy heat is reduced for the same reasons as described above, and therefore the cycle characteristic is improved. It is considered that in a battery made in accordance with this construction, i.e., in a battery in which two types of materials each which shows a different sign of entropy heat during charge over a potential range of from 3.0 V to 4.2 V are used, each of the materials also shows a sign of the total sum of entropy heat different from each other.

Furthermore, in a lithium secondary battery according to the present invention, a weight ratio of the material which shows one of positive and negative signs of entropy heat during charge to the material which shows the other one of the signs of entropy heat during charge may be restricted within the range of from 1:9 to 9:1.

The reason for the restriction of the weight ratio of the two types of materials as above is that the amount of entropy heat is increased during discharge in the case of an excessive amount of the material showing a negative sign of entropy heat being used, and the amount of entropy heat is increased during charge in the case of an excessive amount of the material showing a positive sign of entropy heat being used.

Furthermore, in a lithium secondary battery according to the second aspect of the present invention, a material which shows a negative sign of entropy heat during charge may consist of $LiCoO_2$ and/or $LiCo_{0.5}Ni_{0.5}O_2$, and a material which shows positive sign of entropy heat during charge may consist of $LiNiO_2$ and/or $LiMn_2O_4$.

Furthermore, in a lithium secondary battery according to the third and fourth aspects of the present invention, a material which shows a negative sign of entropy heat during charge may consist of $LiCoO_2$, and the material which shows positive sign of entropy heat during charge may consist of $LiNiO_2$ and/or $LiMn_2O_4$.

Further, in a lithium secondary battery according to the present invention, a battery capacity may be made not less than 3 Ah.

For such a battery with such a large battery capacity as the one with over 3 Ah, the present invention is particularly effective, since, in such a battery, a battery surface area per unit volume of the power generating element is rendered considerably small and thereby the heat releasing quality is notably deteriorated.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
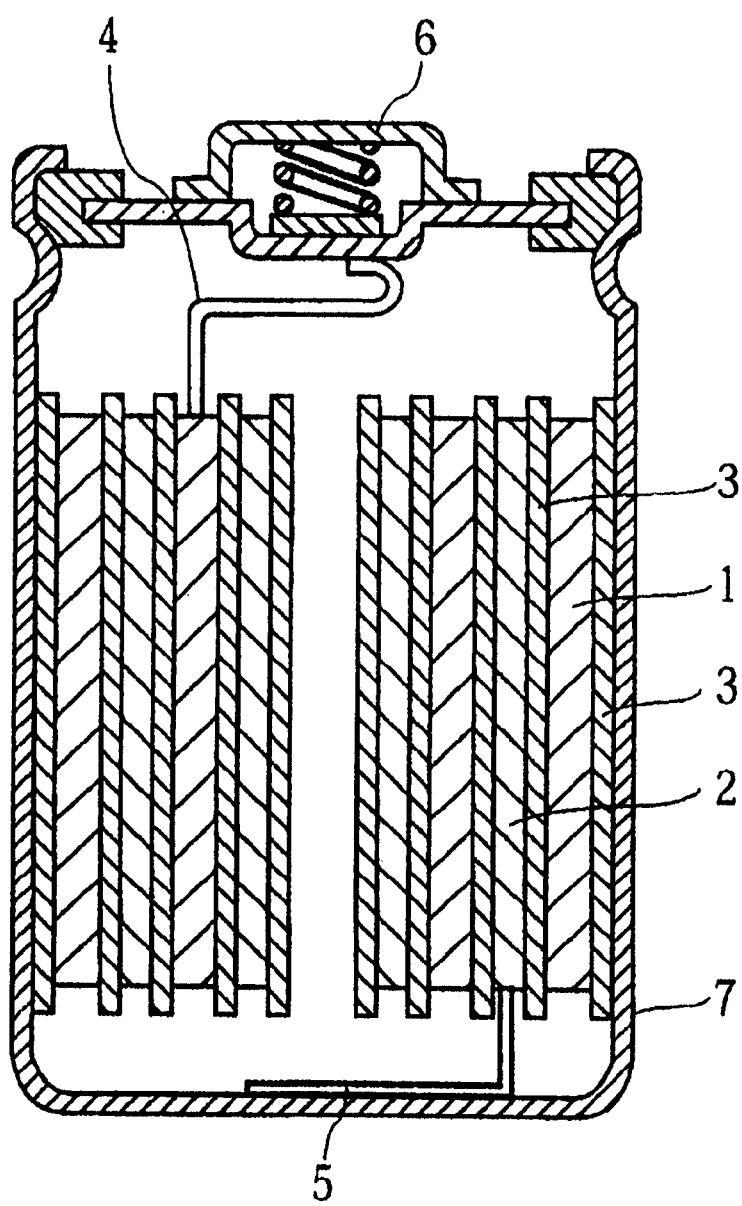
FIG. 1 is a cross-sectional view of a lithium secondary battery according to the present invention.
Figure 2:
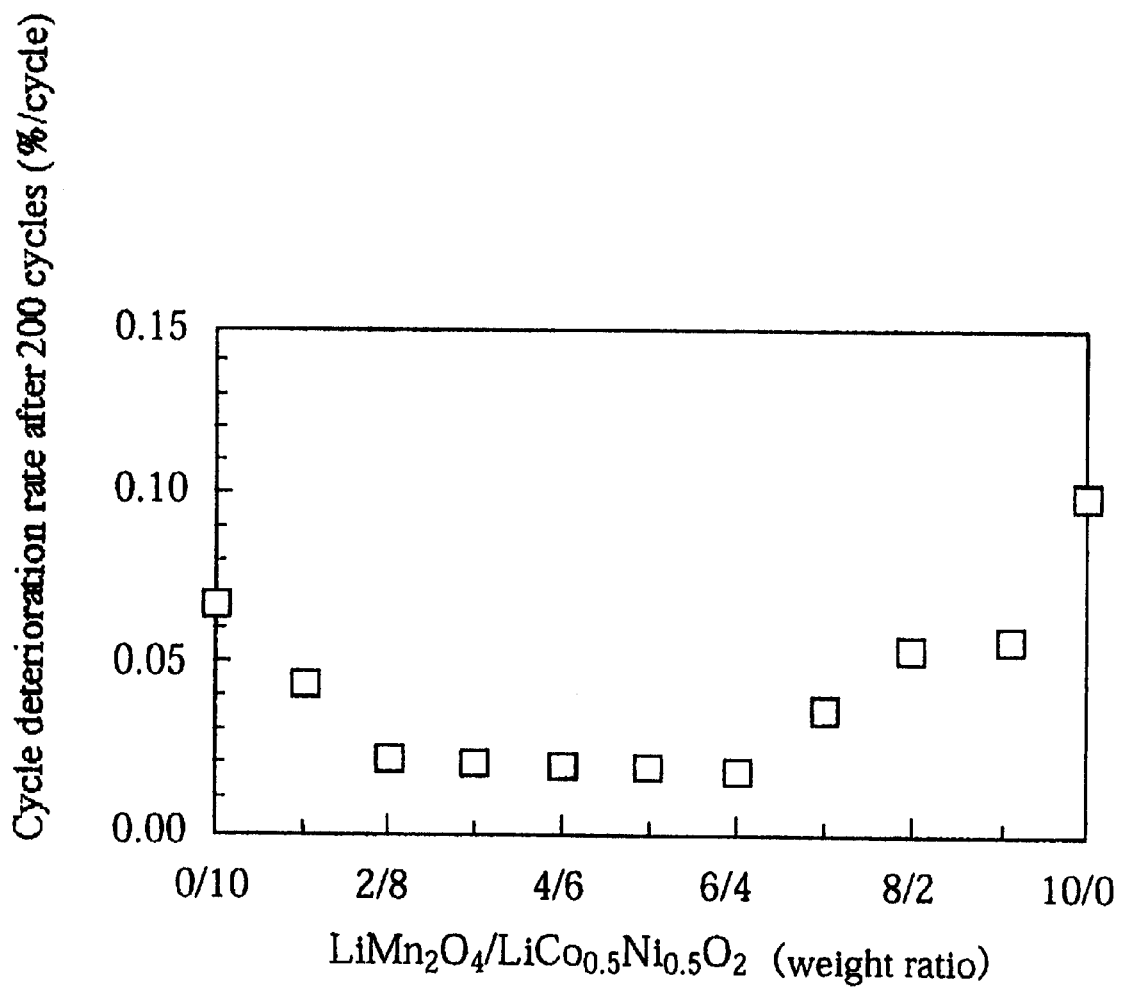
FIG. 2 is a graph showing a relationship of a weight ratio of $LiMn_2O_4$ to $LiCo_{0.5}Ni O_2$ and a cycle deterioration rate after 200 cycles.

With reference to FIGS. 1 and 2, there is detailed the preferred embodiments made in accordance with the present invention.

Preliminary Experiment

Firstly, an entropy heat of the materials usable for a positive electrode active material ($LiCoO_2$, $LiCo_{0.5}Ni_{0.5}O_2$, $LiMn_2O_4$, and $LiNiO_2$) were measured. Then, from the results of the measurement, the materials were classified into two groups according to each sign of a total sum of the entropy heat during charge shown by each of the materials. The table 1 below shows the results. It is noted that the measurement of the entropy heat was carried out according to the following conditions. Each of the subjected positive electrode material, which was adjusted to have an electric potential of 3.0 V, 3.7 V, or 4.2 V with reference to a lithium metal at 25° C. as a reference ($Li/Li^+$), was cooled down to 0° C., and an electric potential of each material was measured. In the case of the potential at 0° C. being lower than the potential at 25° C., it was defined that a sign of an entropy heat generation during charge is "positive", and in the case of the potential at 0° C. being higher than the potential at 25° C., it was defined that a sign of an entropy heat generation during charge is "negative".

TABLE 1

| | Potential (Li/Li*) | | |
| --- | --- | --- | --- |
| | 3.0 V | 3.7 V | 4.2 V |
| Sign of heat generated by an entropy change during charge is negative (Generate heat during discharge) | $LiCoO_2$ $LiCo_{0.5}Ni_{0.5}O_2$ | $LiCoO_2$ | $LiCoO_2$ |
| Sign of heat generated by an entropy change is positive (Absorb heat during discharge) | $LiNiO_2$ $LiMn_2O_4$ | $LiNiO_2$ $LiMn_2O_4$ $LiCo_{0.5}Ni_{0.5}O_2$ | $LiNiO_2$ $LiMn_2O_4$ $LiCo_{0.5}Ni_{0.5}O_2$ |

As seen from the above Table 1, within the range of the potential with reference to the lithium metal at 25° C. being 3.0 V-4.2V, it is considered that basically no change of the sign of entropy heat from one sign to the other occurs in each material for the positive electrode. However, it is understood that in some materials, depending on the potential, there occurs such a change of the sign of entropy heat. (In the above Table 1, $LiCo_{0.5}Ni_{0.5}O_2$ is such a material.)

On the basis of the result of the experiment, the batteries as described below were prepared, and the experiments were performed using the prepared batteries.

EXAMPLE 1

Preparation of a Positive Electrode

Firstly, for the positive electrode materials, $LiNiO_2$ was selected as a material which shows a positive sign of entropy heat in 3.0 V, 3.7 V, and 4.2 V during charge, and $LiCoO_2$ was selected as a material which shows a negative sign of entropy heat during charge. These materials were blended in a weight ratio of 1:1. The above lithium metal oxides were obtained by firstly mixing a hydroxide of lithium and hydroxides of nickel, manganese, and cobalt, and subsequently baking the resulting material for 24 hours in the air at a temperature of 800° C.

Secondly, a positive electrode mixture was prepared by mixing this mixed positive electrode active material and a synthetic graphite as a conductivity enhancer with a weight ratio of 90:5, and thereafter an NMP solution was prepared by dissolving polyvinylidene fluoride as a binder in N-methyl-2-pyrrolidone (NMP). Subsequently, a slurry was prepared by kneading the positive electrode mixture and the NMP solution so that a weight ratio of the positive electrode mixture to the polyvinylidene fluoride results in 95:5. The resulting slurry was applied onto both surfaces of an aluminum foil as a positive electrode current collector using a doctor blade method, and thereafter the positive electrode current collector with the slurry was vacuum-dried for 2 hours at a temperature of 150° C. A positive electrode according to the invention was thus prepared.

Preparation of a Negative Electrode

Firstly, a block coal ($D_{002}$ value=3.356 Å, Lc value>1000 Å) was pulverized by applying air jet (jet-milling) and the resulting matter was screened so as to obtain a graphite powder with an average particle size of 10 μm. At the same time, polyvinylidene fluoride as a binder was dissolved in NMP to prepare an NMP solution. Secondly, in order to prepare a slurry, the graphite powder and the NMP solution were kneaded so that a weight ratio of the graphite powder to the polyvinylidene fluoride results in 85:15. The resulting slurry was applied onto both surfaces of a copper foil as a negative electrode current collector with the use of a doctor blade method, and thereafter the negative electrode current collector with the slurry was vacuum-dried for 2 hours at a temperature of 150° C. A negative electrode according to the invention was thus prepared.

Preparation of an Electrolytic Solution

A non-aqueous electrolytic solution was prepared by dissolving $LiPF_6$ at a ratio of 1 M (mol/liter) in a solvent in which ethylene carbonate and diethyl carbonate (DEC) was mixed in a volume ratio of 1:1.

Assembling a Battery

A cylindrical battery in accordance with the present invention was produced using the above-described positive electrode, the negative electrode, and the non-aqueous electrolytic solution. As the separator, a fine porous film made of polyethylene was employed, and the aforementioned non-aqueous electrolytic solution was impregnated into the separator.

FIG. 1 shows a schematic cross-sectional view of a battery made in accordance with a preferred embodiment. The battery shown in FIG. 1 comprises a positive electrode 1, a negative electrode 2, a separator 3 for separating the electrodes, a positive electrode lead 4, a negative electrode lead 5, a positive electrode external terminal 6, a negative electrode can 7, and so forth. The positive electrode 1, the negative electrode 2, and the separator 3 interposed therebetween are spirally wound and enclosed in the negative electrode can 7. The positive electrode 1 is connected with the positive electrode external terminal 6 and the negative electrode 2 is connected with the negative electrode can 7 so that a chemical energy generated in the battery can be extracted and utilized as an electric energy.

The battery prepared in accordance with the above-described manner is hereinafter referred to as a "battery A1" of the present invention.

EXAMPLE 2

A battery having the same construction as the battery of Example 1 was prepared except that in selecting a positive electrode material, $LiCo_{0.5}Ni_{0.5}O_2$ was employed as a material which shows a negative sign of entropy heat in 3.0 V during charge.

The battery prepared in accordance with this manner is hereinafter referred to as a "battery A2" of the present invention.

EXAMPLE 3

A battery having the same construction as the battery of Example 1 was prepared except that in selecting a positive electrode material, $LiMn_2O_4$ was employed as a material which shows a positive sign of entropy heat in 3.0 V. 3.7 V, and 4.2 V during charge.

The battery prepared in accordance with this manner is hereinafter referred to as a "battery A3" of the present invention.

EXAMPLE 4

A battery having the same construction as the battery of Example 1 was prepared except that in selecting a positive electrode material, $LiCo_{0.5}Ni_{0.5}O_2$ was employed as a material which shows a negative sign of entropy heat in 3.0 V during charge, and $LiMn_2O_4$ was employed as a material which shows a positive sign of entropy heat 3.0 V during charge.

The battery prepared in accordance with this manner is hereinafter referred to as a "battery A4" of the present invention.

Comparative Example 1

A battery having the same construction as the battery of Example 1 was prepared except that in selecting a positive electrode material, a material which shows a negative sign of entropy heat in 3.0 V during charge was not employed, and $LiNiO_2$ and $LiMn_2O_4$ were employed, both of which are the material which shows a positive sign of entropy heat in 3.0 V during charge.

The battery prepared in accordance with this manner is hereinafter referred to as a "comparative battery X1".

Comparative Example 2

A battery having the same construction as Example 1 was prepared except that in selecting a positive electrode material, a material which shows a positive sign of entropy heat in 3.0 V during charge was not employed, and $LiCoO_2$ and $LiCo_{0.5}Ni_{0.5}O_2$ were employed, both of which are the material which shows a negative sign of entropy heat in 3.0 V during charge.

The battery prepared in accordance with this manner is hereinafter referred to as a "comparative battery X2".

For the sake of illustrating, in Table 2 below, there are shown the positive electrode materials used for the batteries A1 to A4 of the present invention and the comparative batteries X1 and X2, and the potentials.

TABLE 2

| Battery | Positive electrode material | | Potential (Li/Li$^+$) |
|---|---|---|---|
| | Sign of entropy heat during charge is positive | Sign of entropy heat during charge is negative | |
| A1 | LiNiO$_2$ | LiCoO$_2$ | 3.0 V, 3.7 V, 4.2 V |
| A2 | LiNiO$_2$ | LiCo$_{0.5}$Ni$_{0.5}$O$_2$ | 3.0 V |
| A3 | LiMn$_2$O$_4$ | LiCoO$_2$ | 3.0 V, 3.7 V, 4.2 V |
| A4 | LiMn$_2$O$_4$ | LiCo$_{0.5}$Ni$_{0.5}$O$_2$ | 3.0 V |
| X1 | LiNiO$_2$ + LiMn$_2$O$_4$ | — | 3.0 V |
| X2 | — | LiCoO$_2$ + LiCo$_{0.5}$Ni$_{0.5}$O$_2$ | 3.0 V |

Experiment 1

A cycle deterioration rate after 200 cycles (cycle characteristic) was examined using the batteries A1 to A4 of the present invention and the comparative batteries X1 and X2, by charging and discharging these subjected batteries at room temperature. The results are shown in Table 3 below. The conditions of charge and discharge were as follows; Using a constant current method, subjected batteries were charged at a charge current of 1.2 A until an end-of-charge voltage of 4.1 V was obtained, and thereafter discharged at a discharge current of 1.2 A until an end-of-discharge voltage of 2.7 V was obtained. The cycle deterioration rate was obtained according to the following manner; Firstly, an initial capacity and a discharge capacity after 200 cycles for each battery were measured, and then the measured values were assigned into the following equation.

$$\text{Cycle deterioration rate (\%/cycle)} = \frac{(\text{Initial capacity} - \text{Discharge capacity after 2000 cycles})}{\text{Initial capacity}} / \text{Cycle} \times 100$$

TABLE 3

| Battery | Initial capacity (Ah) | Capacity after 200 cycles | Cycle deterioration rate (%/cycle) |
|---|---|---|---|
| A1 | 3.0 | 2.7 | 0.050 |
| A2 | 3.0 | 2.7 | 0.050 |
| A3 | 2.6 | 2.5 | 0.019 |
| A4 | 2.6 | 2.5 | 0.019 |
| X1 | 2.6 | 2.3 | 0.058 |
| X2 | 3.0 | 2.4 | 0.100 |

As seen from the above Table 3, it is recognized that the batteries A1 to A4 of the present invention achieved a reduced cycle deterioration rate in comparison with the comparative batteries X1 and X2. Accordingly, it is considered that in order to improve a cycle characteristic, when selecting a positive electrode material, it is preferable that both the material with a sign of entropy heat generation being positive in charging and the material with a sign of entropy heat generation being negative in charging be employed.

Experiment 2

The batteries having the same construction as the battery A4 in Example 4 were prepared except that a mixing ratio of LiMn$_2$O$_4$ to LiCo$_{0.5}$Ni$_{0.5}$O$_2$ was varied (0:10 to 10:0 by weight ratio), and the cycle deterioration rates after 200 cycles (cycle characteristic) for these batteries were examined. The results are shown in Table 4 below and FIG. 2. The conditions of charge and discharge, and the calculation of the cycle deterioration rate were the same as in the above Experiment 1.

TABLE 4

| Mixing ratio LiMn$_2$O$_4$/LiCo$_{0.5}$Ni$_{0.5}$O$_2$ | Initial capacity (Ah) | Capacity after 200 cycles (Ah) | Cycle deterioration rate (%/cycle) |
|---|---|---|---|
| 0/10 | 2.2 | 1.9 | 0.068 |
| 1/9 | 2.3 | 2.2 | 0.043 |
| 2/8 | 2.4 | 2.3 | 0.021 |
| 3/7 | 2.5 | 2.4 | 0.020 |
| 4/6 | 2.6 | 2.5 | 0.019 |
| 5/5 | 2.6 | 2.5 | 0.019 |
| 6/4 | 2.6 | 2.5 | 0.019 |
| 7/3 | 2.7 | 2.5 | 0.037 |
| 8/2 | 2.8 | 2.5 | 0.054 |
| 9/1 | 2.8 | 2.5 | 0.054 |
| 10/0 | 3.0 | 2.4 | 0.100 |

As apparent from the above Table 4 and FIG. 4, when the mixing ratio of LiMn$_2$O$_4$ to LiCo$_{0.5}$Ni$_{0.5}$O$_2$ by weight ratio is within the range from 1:9 to 9:1, the cycle deterioration rate stays in a low level and thereby a advantageous cycle characteristic can be attained.

Supplementary Notes (1) The negative electrode material for the present invention is not limited to the above-mentioned graphite powder. Some other examples usable include carbon materials such as coke and the like, lithium metals, lithium alloys, metal oxides such as Li$_x$Fe$_2$O$_3$, Li$_x$WO$_2$ and the like, conductive polymers such as polyacethylene and the like. Note, however, that particularly excellent effect is exhibited in the case where carbon materials such as graphite are used for the negative electrode. As for graphite and coke used as the carbon material, the pulverized graphite or coke may be used without being pretreated, or the pretreated materials may be used, to which a pretreatment such as a heat treatment (500-3700° C.), an acid treatment, an alkali treatment, an expanding treatment and the like treatment is subjected. In addition, in order for the battery to sufficiently exhibit the battery performance, it is preferable that a d$_{002}$ value of graphite be within the range of from 3.35 Å to 3.37 Å, and an Lc value of graphite be not less than 400 Å.

(2) The other members constituting the battery such as the electrolyte and separator for the present invention are also not limited to the kind described above, but various types of conventional materials practically used or suggested for non-aqueous type batteries may be used with no particular restrictions. For instance, as the examples of the electrolyte other than the aforementioned LiPF$_6$, there are suggested LiClO$_4$, LiCF$_3$SO$_3$, and the like material containing metal ions such as lithium ions. As an organic solvent for the electrolytic solution, propylene carbonate, dimethoxyethane, dimethyl carbonate, sulfolane and the like solvent may be used individually, or with these solvents mixed together, other than the above-described mixed solvent of ethylene carbonate and diethyl carbonate. As an example of the electrolytic solution, there is shown a solution in which one of the above electrolytes is dissolved in a solvent described above.

(3) The present invention is not limited to a lithium secondary battery having a cylindrical shape, but naturally, can be suitably applied to lithium secondary batteries having various shapes such as an oblate shape and a square shape.

Although the present invention and its advantages have been described in detail, it should be understood that various changes, substitutions, and alterations can be made herein without departing from the spirit and scope of the invention as defined by the appended claims.

What is claimed is:

1. A lithium secondary battery comprising:

a positive electrode having a positive electrode active material composed of a mixture of at least two reversible lithium intercalation materials, said mixture in which $LiMn_2O_4$ is mixed with $LiCo_{0.5}Ni0.5O_2$ which is a material showing a negative sign of heat generated by an entropy change at a potential of 3.0 V during charge and showing a positive sign of heat generated by an entropy change at a potential of 3.7 V or higher during charge, the potentials being determined with reference to a potential of lithium metal at 25° C., so that the weight ratio of $LiMn_2O_4$ to $LiCo_{0.5}Ni_{0.5}O_2$ is in the range of from 2:8 to 6:4;

a negative electrode having a negative electrode active material composed of a reversible lithium intercalation material;

an electrolytic solution;

a separator impregnated between said electroclytic electrode; and a battery can;

wherein said positive and negative electrodes are spirally wound with said separator interposed therebetween, and enclosed in said battery can.

2. A lithium secondary battery according to claim 1, wherein said weight ratio is in the range of from 4:6 to 6:4.

3. A lithium secondary battery according to claim 1, wherein said weight ratio is in the range of from 4:6 to 6:4.

* * * * *

UNITED STATES PATENT AND TRADEMARK OFFICE
CERTIFICATE OF CORRECTION

PATENT NO.    : 6,428,930 B2
DATED         : August 6, 2002
INVENTOR(S)   : Takeshi Maeda et al.

It is certified that error appears in the above-identified patent and that said Letters Patent is hereby corrected as shown below:

Column 10,
Lines 6 and 7, "between said electroclytic electrode" should read
-- with said electrolytic solution --; and
Lines 16 and 17, delete claim 3.

Signed and Sealed this

Eighth Day of April, 2003

JAMES E. ROGAN
*Director of the United States Patent and Trademark Office*